United States Patent
Yachida

(10) Patent No.: US 8,326,064 B2
(45) Date of Patent: Dec. 4, 2012

(54) IMAGE RE-ENCODING METHOD TO DECODE IMAGE DATA WHICH IS ORTHOGONALLY TRANSFORMED PER FIRST BLOCK AND ENCODED BY A FIRST ENCODING METHOD

(75) Inventor: Shoji Yachida, Tokyo (JP)

(73) Assignee: NEC Corporation, Tokyo (JP)

( * ) Notice: Subject to any disclaimer, the term of this patent is extended or adjusted under 35 U.S.C. 154(b) by 695 days.

(21) Appl. No.: 12/524,020

(22) PCT Filed: Jan. 17, 2008

(86) PCT No.: PCT/JP2008/050490
§ 371 (c)(1),
(2), (4) Date: Jul. 22, 2009

(87) PCT Pub. No.: WO2008/090793
PCT Pub. Date: Jul. 31, 2008

(65) Prior Publication Data
US 2010/0086225 A1    Apr. 8, 2010

(30) Foreign Application Priority Data

Jan. 22, 2007   (JP) ................................ 2007-011329

(51) Int. Cl.
*G06K 9/36* (2006.01)
*G06K 9/40* (2006.01)
*G06K 9/46* (2006.01)
(52) U.S. Cl. ....................................... 382/239; 382/260
(58) Field of Classification Search ................ 382/232, 382/233, 239, 240, 243, 251, 254, 260–264, 382/266, 275; 375/240.08, 240.12, 240.27, 375/240.29, E07.243; 348/420.1, 606, 607, 348/625
See application file for complete search history.

(56) References Cited

U.S. PATENT DOCUMENTS

| 6,665,346 B1 * | 12/2003 | Lee et al. ................. 375/240.29 |
| 6,996,285 B2 * | 2/2006 | Unruh et al. ................. 382/251 |
| 7,003,174 B2 * | 2/2006 | Kryukov et al. ............. 382/266 |
| 7,822,125 B2 * | 10/2010 | Bjontegaard ............. 375/240.29 |

(Continued)

FOREIGN PATENT DOCUMENTS

JP    1995170512 A    7/1995

(Continued)

OTHER PUBLICATIONS

International Search Report for PCT/JP2008/050490 mailed Apr. 15, 2008.

*Primary Examiner* — Amir Alavi

(57) ABSTRACT

Provided is an image re-encoding method which simultaneously satisfies reduction of block distortion and reduction of a memory when re-encoding image data encoded by a first encoding method, by a second encoding method. An image re-encoding method comprises the steps of decoding image data encoded per block by the first encoding method; and encoding the image data decoded in the step of decoding, per block by the second encoding method. The step of encoding the image data includes the steps of: performing boundary detection to detect a block boundary of the image data encoded by the first encoding method, with the use of the image data encoded by the first encoding method; and deblocking to perform a deblocking filter process to the block boundary detected in the step of performing boundary detection.

27 Claims, 5 Drawing Sheets

U.S. PATENT DOCUMENTS

| | | | |
|---|---|---|---|
| 2007/0183496 A1* | 8/2007 | Kadono et al. | 375/240.08 |
| 2010/0086225 A1* | 4/2010 | Yachida | 382/239 |
| 2010/0128168 A1* | 5/2010 | Zhen et al. | 348/420.1 |
| 2011/0129160 A1* | 6/2011 | Obara | 382/233 |
| 2011/0188574 A1* | 8/2011 | Matsuo et al. | 375/240.12 |

FOREIGN PATENT DOCUMENTS

| | | |
|---|---|---|
| JP | 1996149470 A | 6/1996 |
| JP | 1996317389 A | 11/1996 |
| JP | 1998056646 A | 2/1998 |
| JP | 2001258026 A | 9/2001 |
| JP | 2002199403 A | 7/2002 |
| JP | 2004140863 A | 5/2004 |
| JP | 2004328634 A | 11/2004 |
| JP | 2005167991 A | 6/2005 |
| JP | 2006197521 A | 7/2006 |
| JP | 2006203724 A | 8/2006 |
| JP | 2006237759 A | 9/2006 |
| WO | 0048402 A | 8/2000 |

* cited by examiner

FIGURE 2

| Frame Parameter Name | No.of Bits |
|---|---|
| Horizontal Size Value | 12 |
| Vertical Size Value | 12 |
| Aspect Ratio Information | 4 |
| Frame Rate Code | 4 |
| Picture Coding Order | 10 |
| Progressive Sequence | 1 |
| Picture Coding Type | 3 |
| Forward Horizontal F Code | 4 |
| Forward Vertical F Code | 4 |
| Backward Horizontal F Code | 4 |
| Backward Vertical F Code | 4 |
| Intra DC Precision | 2 |
| Picture ST Ructure | 2 |
| Top Field First | 1 |
| Frame Predictive Frame Dct | 1 |
| Repeat First Field | 1 |
| Progressive Frame | 1 |

FIGURE 3

| Macro Block Parameter Name | No.of Bits |
|---|---|
| Q Scale Type | 1 |
| Q Scale | 7 |
| DCT Type | 1 |
| Macro Block Type Quant | 1 |
| Macro Block Type Motion Forward | 1 |
| Macro Block Type Motion Backward | 1 |
| Macro Block Type Pattern | 1 |
| Macro Block Type Intra | 1 |
| Motion Vector Format | 1 |
| Motion Type | 2 |

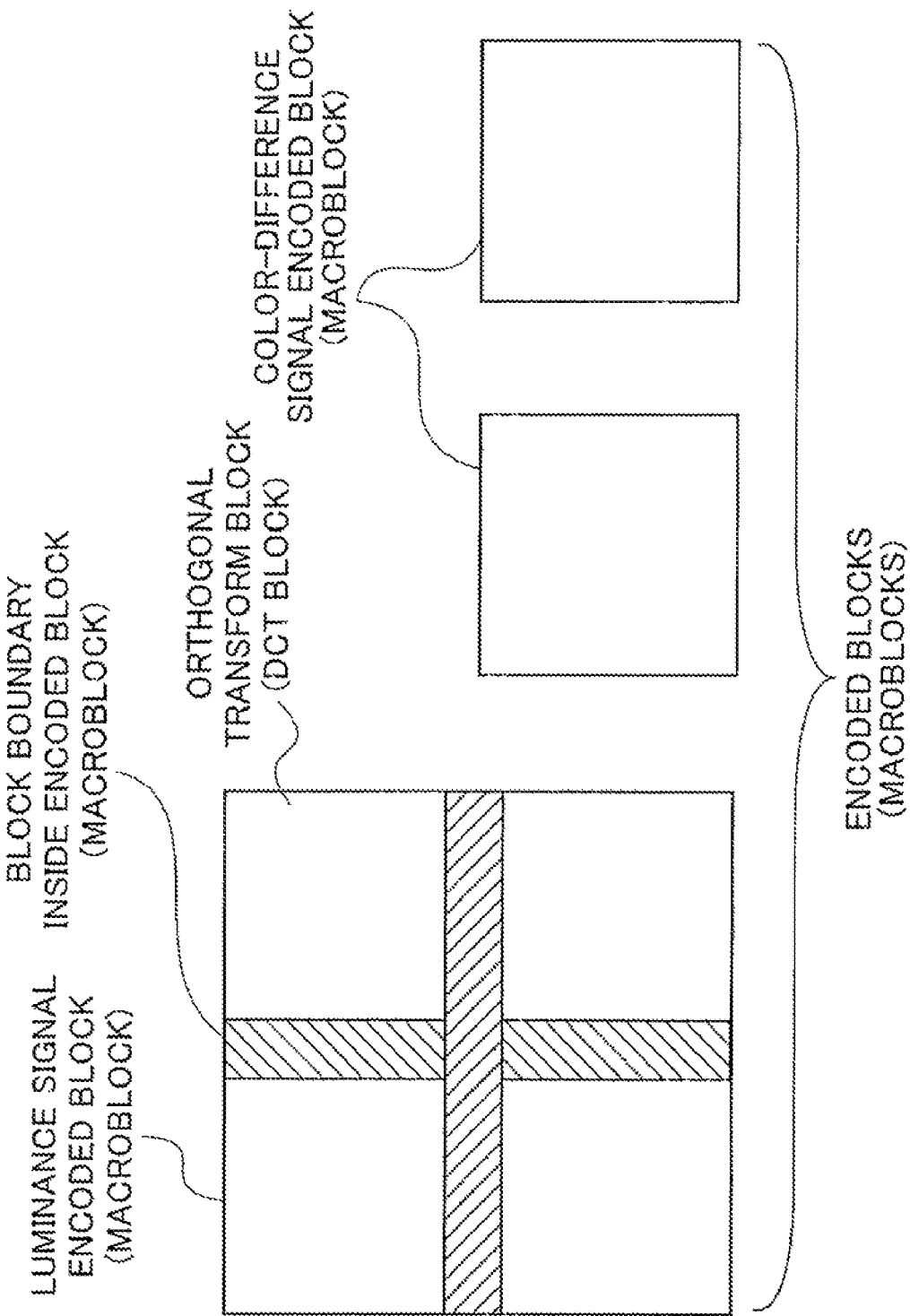

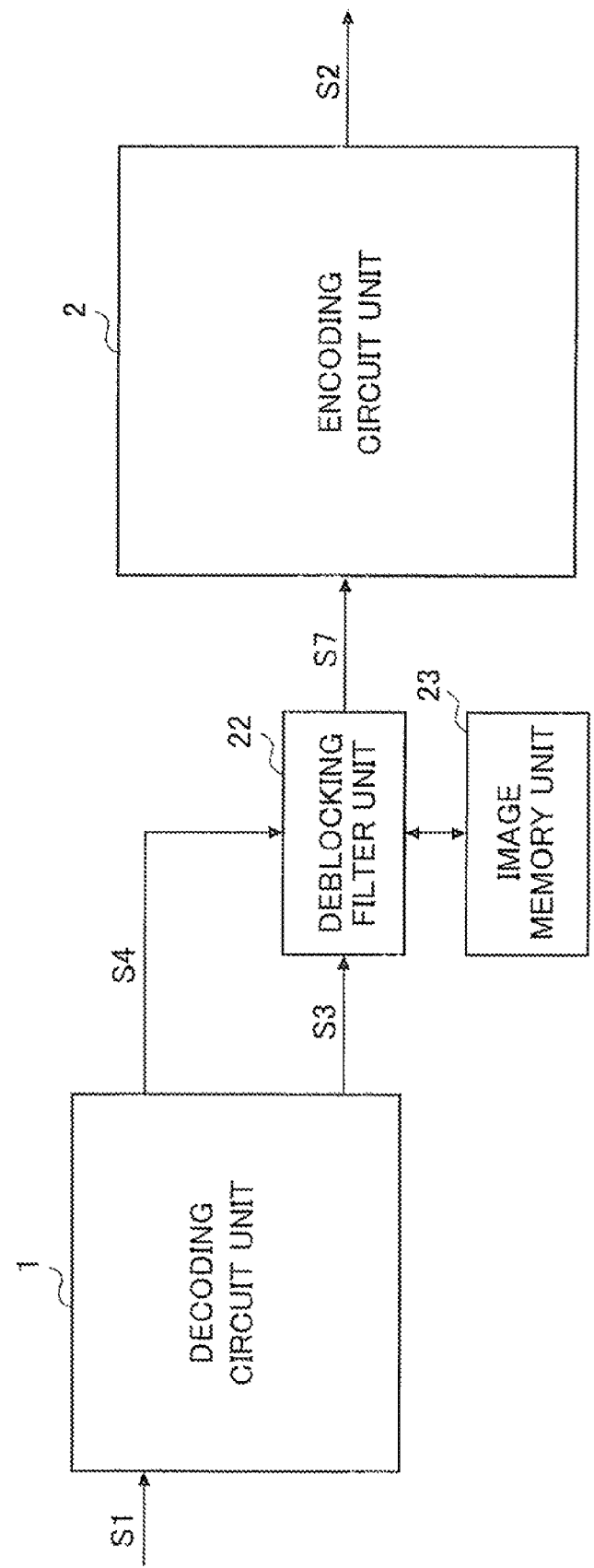

IMAGE RE-ENCODING METHOD TO DECODE IMAGE DATA WHICH IS ORTHOGONALLY TRANSFORMED PER FIRST BLOCK AND ENCODED BY A FIRST ENCODING METHOD

TECHNICAL FIELD

The present invention relates to an image re-encoding method, an image re-encoding device, and an image re-encoding program, in which image data encoded by a certain encoding method is re-encoded with another parameter or by another encoding method.

BACKGROUND ART

An image re-encoding method, an image re-encoding device, and an image re-encoding program are utilized, for example in order to increase a compression ratio of image data further.

Patent literature, PTL 1, discloses an image re-encoding device in which a decoding unit decodes a source encoded stream to generate decoded video data, and at the same time, extracts an encoding parameter of the past, superimposed in the encoded stream, and a re-encoding unit receives the decoded video data and the encoding parameter of the past, and performs an encoding process using the encoding parameter of the past.

Patent literature, PTL 2, discloses a block distortion removal device in which a level difference between a target pixel and an adjoining reference pixel is calculated by a delay circuit and a subtraction unit, and inputted into a nonlinear circuit, then, the nonlinear process circuit determines that there is block distortion when the level difference is in a predetermined range, and outputs the amount of the block distortion.

Patent literature, PTL 3, discloses a decoding device, in which signal processing is performed to decrease a high-frequency component adaptively according to the difference of magnitude of a block quantization width, by supplying a control signal generated by a control signal generation unit to a variable-passband low pass filter. Here, filtering is performed: to a boundary of a unit block included in an area in which the detected block quantization width information indicates a value larger than a predetermined value, after a block quantization width detector detects the block quantization width information out of the additional information included in a bit stream; and to a boundary of a unit block included in an area in which an individually-set block quantization width value indicates a large difference from a block quantization width value set up in an adjoining area.

CITATION LIST

Patent Literature

{PTL 1} WO/2000/048402 pamphlet
{PTL 2} JP-A No. H08 (1996)-317389
{PTL 3} JP-A No. H08 (1996)-149470

SUMMARY OF INVENTION

Technical Problem

In the device in related art disclosed by Patent literature, PTL 1, the image data and the encoding parameter which are obtained by decoding the first MPEG-2 encoding image data by the decoding device are synchronized and fed to the encoding device; accordingly, image quality deterioration due to multiplex coding is suppressed by encoding the image data using the encoding parameter. However, it is difficult to detect block distortion of the first MPEG-2 encoding image data, and to reduce the block distortion.

The devices in related art disclosed by Patent literature, PTL 2 and PTL 3, only remove the block distortion, but it is difficult for the encoding device to reduce the block distortion generated at the time of decoding.

Furthermore, when the devices in related art disclosed by Patent literature, PTL 2 and PTL 3, are coupled between the decoding device and the encoding device, it becomes necessary to provide a storage device (memory) with more than one macroblock line at least (a macroblock in MPEG-2 arranged in the horizontal direction of a screen; for example, 16 line memories). Accordingly, in order to realize a transcode which reduces the block distortion of the first MPEG-2 encoding image data, there arises a problem of increase of the processing time of all the transcode, and increase of a circuit scale due to addition of the storage device (memory).

One example of a block diagram of the device in related art is explained with reference to FIG. 6. Image data S1 encoded by the first encoding method is decoded to baseband image data S3 by a decoding circuit unit 1, and inputted into a deblocking filter unit 22 together with encoding parameter information S4 separated at the time of decoding. The deblocking filter unit 22 possesses an image memory 23 of size with which at least an encoded block can be arranged in the horizontal line of the image data. The deblocking filter unit 22 reduces the block distortion in a horizontal boundary and a vertical boundary of the encoded block, and outputs baseband image data S7. Subsequently, an encoding circuit unit 2 encodes the baseband image data S7 by the second encoding method, and outputs image data S2.

The present invention has been made in view of the above circumstances and provides an image re-encoding method, an image re-encoding device, and an image re-encoding program, which satisfy reduction of block distortion and reduction of a memory at the same time, when re-encoding the image data encoded by the first encoding method, by the second encoding method.

Solution to Problem

According to a first aspect of the present invention, provided is an image re-encoding method comprising the steps of: decoding image data encoded per block by a first encoding method; and encoding the image data decoded in the step of decoding, per block by a second encoding method. The step of encoding the image data includes the steps of: performing boundary detection to detect a block boundary of the image data encoded by the first encoding method, with the use of the image data encoded by the first encoding method; and deblocking to perform a deblocking filter process to the block boundary detected in the step of performing boundary detection.

According to a second aspect of the present invention, provided is an image re-encoding method to decode image data which is orthogonally transformed per first block and encoded by a first encoding method with an encoded block unit of plural first orthogonal transform blocks, and to encode the decoded image data per second block by a second encoding method. The image re-encoding method comprises the steps of: performing first deblocking filtering to perform a deblocking process to a block boundary bordered by a first orthogonal transform block in an encoded block in the second encoding; and encoding the second block by determining the first deblocking filter strength with the use of the image data, and by changing the second deblocking filter strength to an encoded block boundary of the first encoding method in accordance with the first deblocking filter strength.

According to a third aspect of the present invention, provided is an image re-encoding program to make a computer execute an image re-encoding method comprising the steps of decoding image data encoded per block by a first encoding method; and encoding the image data decoded in the step of decoding, per block by a second encoding method. The step of encoding the image data includes the steps of: performing boundary detection to detect a block boundary of the image data encoded by the first encoding method, with the use of the image data encoded by the first encoding method; and deblocking to perform a deblocking filter process to the block boundary detected in the step of performing boundary detection.

Advantageous Effects of Invention

The first effect of the present invention lies in the fact that, by transmitting, to the second encoding method, encoding parameter information decoded by a decoding method corresponding to the first encoding method, it becomes unnecessary to provide block distortion reduction means between the decoding device which carries into execution the decoding method corresponding to the first encoding method, and the encoding device which carries into execution the second encoding method. Accordingly, it is possible to provide an image re-compression device which suppresses image quality deterioration without increasing the circuit scale.

The reason is that the block distortion generated by the first encoding method is reduced by adding a block distortion removal filter coefficient obtained with the use of block distortion information generated in the first encoding, to the deblocking filter unit which is arranged at the second encoding method.

The second effect of the present invention lies in the fact that, a removal method of block distortion in an encoded block is provided in the first decoding method, an occurrence condition of block distortion is outputted from the first encoding parameter information, and deblocking filter coefficient information is outputted from difference information of a block boundary; accordingly, it is possible for the second encoding means to reduce the block distortion generated by the first encoding means between encoded blocks and the block distortion generated by the second encoding means. Therefore, since all the pieces of encoding parameter information are not transmitted, it is possible to provide an image re-compression device which has a small circuit scale and suppresses image quality deterioration.

The reason is that wiring for transmitting the first encoding parameter information is omitted, and that the block distortion generated by the first encoding method is reduced, by modifying the block distortion removal filter coefficient of the deblocking filter unit arranged in the second encoding method, with the use of the deblocking filter coefficient information obtained by the first encoding.

BRIEF DESCRIPTION OF DRAWINGS

FIG. 2 An example of encoding frame parameter information.

FIG. 3 An example of encoded macroblock parameter information.

FIG. 5 An example of relationship between an encoded block and an orthogonal transform block.

FIG. 6 A block diagram illustrating an example of a device in related art.

DESCRIPTION OF EMBODIMENTS

Figure 1:
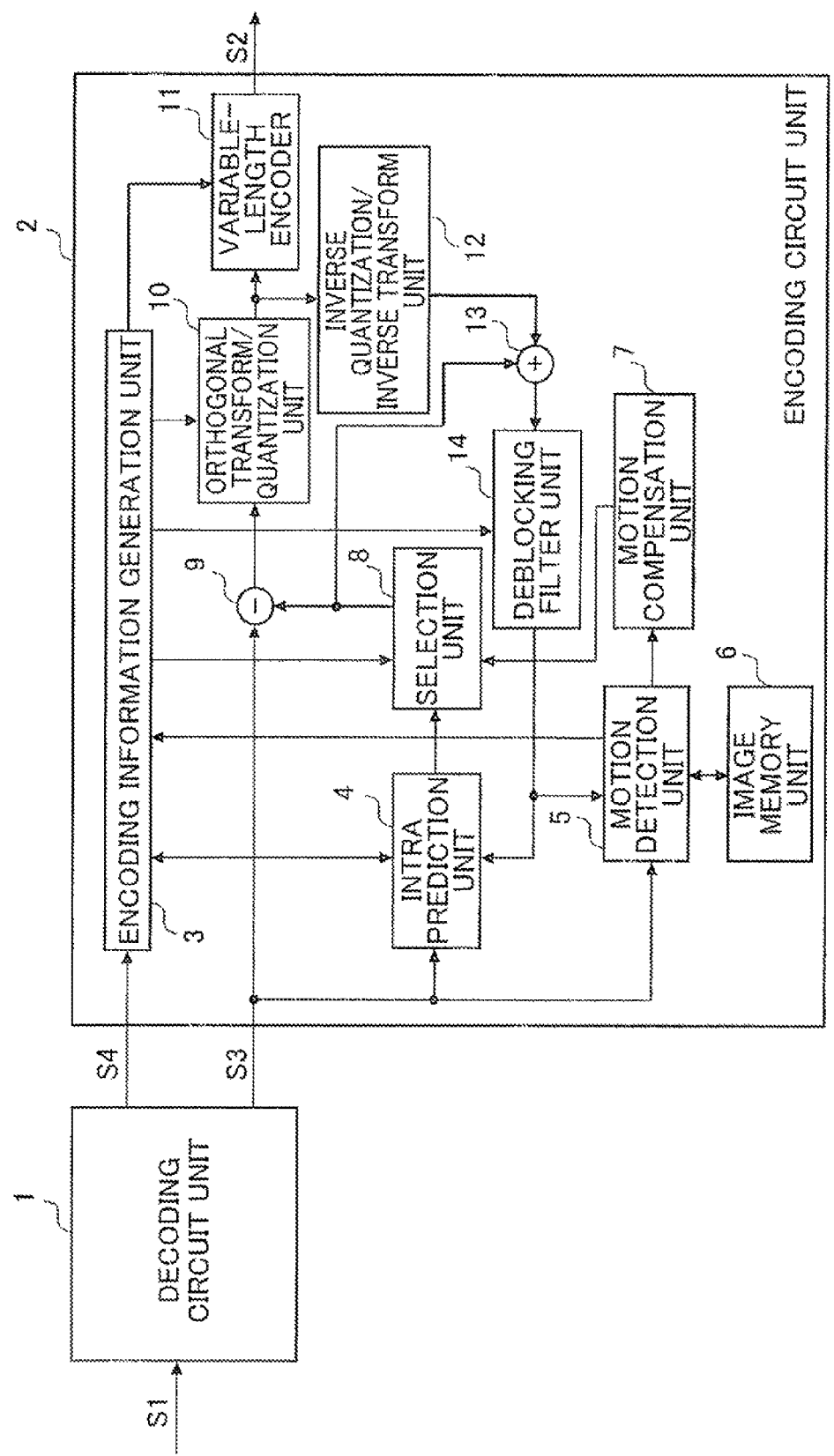
FIG. 1 A block diagram illustrating a first embodiment of the present invention.

When MPEG-2 encoding parameter information is inputted and determined as conditions for occurrence of block distortion, a loop filter in an H.264 encoding device is utilized to reduce the block distortion.

The block distortion is detected using an encoding parameter at the time of MPEG-2 decoding. The block distortion in a macroblock is reduced by a block distortion removal filter at the time of MPEG-2 decoding. Image data after decoding and block distortion removal filter strength are inputted into the H.264 encoding device. In the H.264 encoding device, a parameter for removing block distortion between macroblocks is changed based on the block distortion removal filter strength information.

In order to attain the purpose, an image re-encoding device according to the present invention decodes image data produced by performing the compression encoding to pixel data by the first encoding method in units of blocks, each block being composed by plural pixels defined in advance. Decoding information analyzing means extracts encoding parameter information of the first encoding method from the compressed image data at the time of decoding, and outputs the extracted encoding parameter information, synchronizing with the decoded image data. Furthermore, when encoding by the second encoding method in which the decoded image data is divided into a block of plural pixels defined in advance and compression encoding is performed, the second encoding method has a deblocking filter in order to reduce block distortion in advance, and reduces the block distortion by determining a pattern that the block distortion occurs in a block boundary from the first encoding parameter information, and determining the deblocking filter strength from a difference between pixels in the block boundary.

With such constitution, it is possible to reduce block distortion generated by the first encoding method, without adding block distortion reduction means for reducing block distortion generated by the first encoding method, between decoding means of the first encoding method and encoding means of the second encoding method.

In the present invention, the first encoding method possesses a transform block and an encoded block which are formed by plural pixels defined in advance. When plural transform blocks exist in an encoded block, deblocking coefficient information used for reduction of block distortion in a transform block boundary in the encoded block is outputted synchronizing with the decoded image data, in decoding the encoded data in units of the encoded block. Furthermore, when encoding by the second encoding method in which the decoded image data is divided into a block of plural pixels defined in advance and compression encoding is performed, the second encoding method possesses a deblocking filter to reduce block distortion in advance, and the block distortion in an encoded block boundary generated by the first encoding method also can be reduced by inputting the first deblocking coefficient information into the deblocking filter unit prepared for the purpose of reduction of block distortion of the second encoding method.

With such constitution, it is possible to reduce block distortion generated by the first encoding method, without adding block distortion reduction means for reducing block distortion generated by the first encoding method, between decoding means of the first encoding method and encoding means of the second encoding method. In addition, the encoding parameter information between the decoding means of the first encoding method and the decoding means of the second encoding method can be omitted.

Hereafter, the best mode for practicing the present invention is explained in detail, with reference to the accompanying drawings.

In the present embodiment, although the first compression-encoding method is described in conformity with the standard ISO/IEC 13818-2 (MPEG-2), the first compression-encoding method may be in conformity with the standard ISO/IEC 10918-1 (JPEG), or the standard ISO/IEC 11172-2 (MPEG-1). Although the second compression-encoding method is described in conformity with the standard ISO/IEC 14496-10 (MPEG-4/AVC, H.264), the second compression-encoding method may be in conformity with the standard ISO/IEC 14496-2 (MPEG-4/Visual).

FIG. 1 illustrates constitution of an image re-encoding device according to an embodiment of the present invention. The image re-encoding device includes a decoding circuit unit 1 and an encoding circuit unit 2. The encoding circuit unit 2 possesses an encoding information generation unit 3, an intra prediction unit 4, a motion detection unit 5, an image memory unit 6, a motion compensation unit 7, a selection unit 8, a deblocking filter unit 14, an addition unit 13, a subtraction unit 9, an orthogonal transform/quantization unit 10, an inverse quantization/inverse transform unit 12, and a variable-length encoder 11.

The decoding circuit unit 1 decodes image data S1 encoded by the first encoding method (hereafter referred to as MPEG-2), outputs baseband image data S3 after decoding, and also outputs first encoding parameter information S4. Although various format and information can be considered as the encoding parameter information S4, an example adapted to the present embodiment is illustrated in FIGS. 2 and 3. The parameter information illustrated in FIG. 2 is information outputted for every frame, and the parameter information illustrated in FIG. 3 is information outputted for every macroblock. These pieces of information may be continuously transmitted as a series of information, or may be transmitted as separate files.

Next, the encoding circuit unit 2 outputs image data S2 encoded by the second encoding method (hereafter referred to as H.264). Since the encoding circuit unit 2 performs an encoding process using the encoding parameter information S4, the detailed operation thereof is explained.

The baseband image data S3 is distributed to the intra prediction unit 4, the motion detection unit 5, and the subtraction unit 9. The data inputted into the intra prediction unit 4 is outputted to the deblocking filter unit 14 through the selection unit 8 and the addition unit 13. The deblocking filter unit 14 performs a deblocking process to image data which is in a block boundary in the first encoding method. The output of the deblocking filter unit 14 is again inputted into the intra prediction unit 4.

Here, the detecting method of a block boundary by the first encoding method may be a method of detecting directly from image data, or may be a method of using the encoding parameter information S4. In the case of an MPEG-2 encoding method, for example, since a block size of DCT is 8×8, when a remainder after dividing the current pixel number by 8 is 0, the pixel is a boundary, and otherwise, the pixel is not a boundary.

The intra prediction unit 4 selects a method with better encoding efficiency among intra screen encoding methods defined by the standards, and performs an intra prediction process to the image data to which deblocking process has been performed. Subsequently, the intra prediction unit 4 outputs the result to the selection unit 8. A motion detection process is performed to the image data S3 inputted into the motion detection unit 5, with reference to the reference image data stored in the image memory unit 6 in advance. The image data S3 to which the motion detection has been performed undergoes a motion compensation process by the motion compensation unit 7, and is outputted to the selection unit 8. The selection unit 8 selects one of the data of intra prediction and the data of the motion prediction. The selected signal is outputted to the subtraction unit 9. The difference information between the baseband image data S3 and the signal outputted from the selection unit 8 is inputted into the orthogonal transform/quantization unit 10, and undergoes orthogonal transform and quantization. The output from the orthogonal transform/quantization unit 10 is outputted as the second encoded data S2 via the variable-length encoder 11.

The data which has been orthogonally transformed and quantized undergoes inverse quantization and inverse transform by the inverse quantization/inverse transform unit 12. The output data of the inverse quantization/inverse transform unit 12 is added to the predicted image data by the addition unit 13. The partial compressed-decompressed image data obtained as the result is inputted into the deblocking filter unit 14. In the deblocking filter unit 14, the partial compressed-decompressed image data is processed to reduce the block distortion by the second encoding method. The output signal of the deblocking filter unit 14 is stored in the image memory unit 6 as the reference image data.

The encoding parameter information S4 is inputted into the encoding information generation unit 3. The encoding information generation unit 3 determines deblocking filter strength and a quantization scale from the inputted data of the encoding parameter information S4, the intra prediction, and the motion prediction, and controls the encoding circuit unit 2.

Conventionally, in H.264, the deblocking filter strength is determined by ON/OFF or change of strength of the deblocking filter according to the quantization parameter, and occasionally offset may be added to change the strength. An offset value of the filtering is added to the encoded data as an encoding parameter. However, in the present invention, in addition to it, the deblocking process concerned is performed to a block boundary when encoding by the MPEG-2 method; accordingly, block distortion due to the MPEG-2 encoding is reduced.

Determination of the deblocking filter strength to reduce the block distortion due to the MPEG-2 encoding method uses picture type information (Picture Coding Type), macroblock type information (Macroblock Type Intra), a quantization scale (Q Scale), and DCT type information (DCT Type), included in the encoding parameter information S4.

For example, when the picture type information is an intra picture or when the macroblock type information is an intra type, the deblocking filter is set to ON.

There is also a method of changing the deblocking filter strength according to the quantization scale of MPEG-2. When the quantization is coarse, the strength of the deblocking filter is enhanced compared with a case where the quantization is fine.

Furthermore, the DCT type information may by used. That is, when the DCT type is a frame DCT, a horizontal and a vertical deblocking filter is set to ON, and when the DCT type is a field DCT, only the horizontal deblocking filter is set to ON.

It becomes possible to obtain further mitigation effect of the block distortion of MPEG-2, by performing operation such as ON/OFF or change of the deblocking filter strength through the combination of such kinds of parameter information.

Furthermore, it is possible to consider that ON/OFF of the deblocking filter is determined with the use of an activity value which indicates the degree of complexity of an image as an index. As the activity value of an image, a possible constitution may calculate one of a value of addition of a difference between adjacent pixels, a value of dispersion obtained by calculating the square sum of a difference between the value of each pixel and the mean value of the pixels in the block, and others.

One example is now explained with respect to conditions of the deblocking filter ON/OFF when the activity value of an image is used as an index. Assuming that the mean values of in-block pixels in adjoining blocks are M1 and M2, the difference of the mean values of the in-block pixels is Δ1, the activity values of each block are A1 and A2, the pixel values of a block boundary are ni and pi (i is one of a number from 0 to n; n is the pixel number of one side of an encoded block), the difference of pixel values of the block boundary is Δdi, and the mean value of the difference for every pixel of the block boundary is Δd; then the conditions of ON/OFF of the deblocking filter is determined by the following equations.

$$\Delta 1 = |M1 - M2|$$

$$\Delta di = |ni - pi|$$

$$\Delta d = \Sigma(\Delta di)/n$$

A threshold of the activity values A1 and A2 is set as TH. When at least one of A1 and A2 is smaller than the threshold TH and when Δd is greater than Δ1, the deblocking filter is set to ON.

The deblocking filter unit 14 performs, in a manner of superposition, the deblocking filter process by the first encoding method according to the present invention and the deblocking filter process by the second encoding method according to the standards, such as H.264. Namely, for example, after performing the deblocking filter process by the first encoding method according to the present invention, the deblocking filter unit 14 performs the deblocking filter process by the second encoding method according to the standards, such as H.264; or conversely the deblocking filter unit 14 performs the two kinds of the deblocking filter process in reverse order.

By a series of operations described above, the block distortion due to MPEG-2 encoding can be reduced when the H.264 encoding is performed, and the problem in the past can be solved by the present invention.

Figure 4:
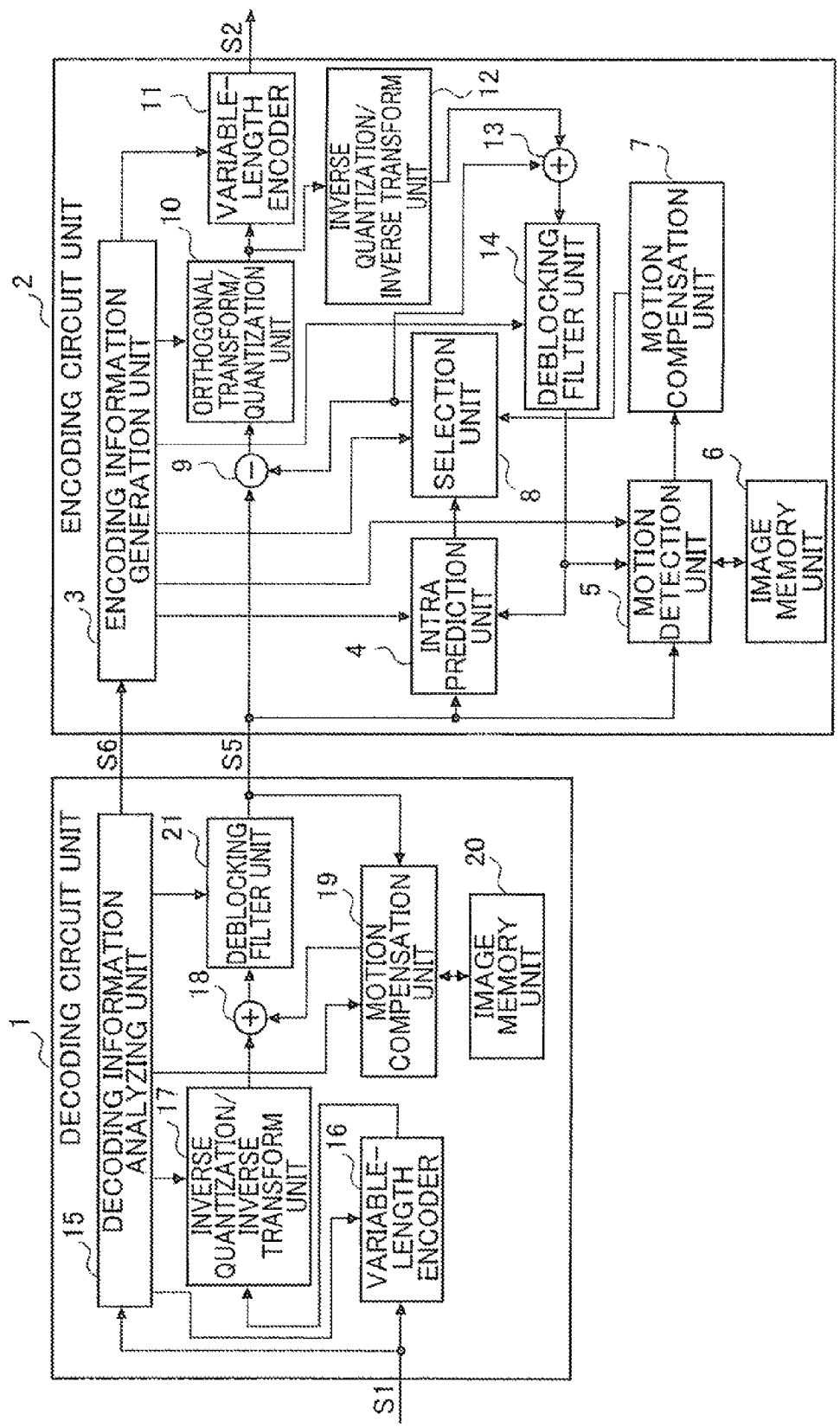
FIG. 4 A block diagram illustrating a second embodiment of the present invention.

FIG. 4 illustrates constitution of an image re-encoding device in another embodiment of the present invention. The image re-encoding device, when roughly divided, includes a decoding circuit unit 1 and an encoding circuit unit 2. In order to decode MPEG-2 encoding image data S1, the decoding circuit unit 1 includes a decoding information analyzing unit 15, a variable-length decoder 16, an inverse quantization/inverse transform unit 17, an addition unit 18, a motion compensation unit 19, an image memory unit 20, and a deblocking filter unit 21. In order to encode the output of the decoding circuit unit 15 to H.264 encoded picture data S2, the encoding circuit unit 2 includes an encoding information generation unit 3, an intra prediction unit 4, a motion detection unit 5, an image memory unit 6, a motion compensation unit 7, a selection unit 8, a subtraction unit 9, an orthogonal transform/quantization unit 10, a variable-length encoder 11, an inverse quantization/inverse transform unit 12, an addition unit 13, and a deblocking filter unit 14.

First, the operation of the decoding circuit unit 1 is explained with reference to the drawing. The decoding information analyzing unit 15 detects header information from the MPEG-2 picture data S1. The variable-length decoder 16 decodes the variable-length data based on the header information, and outputs the decoded result as fixed-length data. Furthermore, the decoding information analyzing unit 15 extracts encoding parameter information, such as picture type information, quantization parameter information, and motion vector information, from the header information. The fixed-length data is inputted into the inverse quantization/inverse transform unit 17 and undergoes inverse quantization and inverse orthogonal transform using the quantization parameter information, etc. When the picture type information indicates that the macroblock concerned is an inter frame encoding block, the addition unit 18 adds the reference image data outputted from the motion compensation unit 19 to the output of the inverse quantization/inverse transform unit 17. When the picture type information indicates that the macroblock concerned is an intra frame encoding block, the addition unit 18 outputs the output of the inverse quantization/inverse transform unit 17 as it is. The output of the addition unit 18 is outputted to the deblocking filter unit 21. The deblocking filter unit 21 reduces block distortion of the inputted signal and outputs the result as baseband image data S5. When the picture type information indicates that the picture concerned is I-picture or P-picture, the image data S5 is stored in the image memory unit 20 as the reference image data. The signal read from the image memory unit 20 undergoes motion compensation by the motion compensation unit 19 according to the motion vector information before being added to the signal outputted from the inverse quantization/inverse transform unit 17.

The deblocking filter unit 21 performs a process to reduce block distortion to an orthogonal transform block boundary in a macroblock as shown in FIG. 5 with oblique lines. Specifically, the deblocking filter unit 21 is a LPF, a linear interpolation unit, etc.

The present embodiment is explained under the assumption that a deblocking filter which is used in H.264 is employed. The decoding information analyzing unit 15 generates deblocking filter coefficient information S6 for ON/OFF control or intensity control of the deblocking filter unit 14. As the deblocking filter coefficient information S6, picture type information (Picture Coding Type), macroblock type information (Macroblock Type Intra), a quantization scale (Q Scale), and DCT type information (DCT Type) are used.

For example, when the picture type information is an intra picture or when the macroblock type information is an intra type, the deblocking filter is set to ON.

There is also a method of changing the deblocking filter strength according to the quantization scale of MPEG-2. That is, when the quantization scale is coarse, the strength of the deblocking filter is enhanced.

Using DCT type information, a horizontal and a vertical deblocking filter may be set to ON when the DCT type is a frame DCT, and only the horizontal deblocking filter may be set to ON when the DCT type is a field DCT.

The strength of deblocking is composed by the combination of such kinds of parameter information. As an example, providing an integer of 8 bits for every macroblock, the deblocking strength is enabled to change in the ranges from 0 to 255.

Next, the operation of the encoding circuit unit 2 is explained with reference to the drawing. The baseband image data S5 is distributed to the intra prediction unit 4, the motion detection unit 5, and the subtraction unit 9. Data inputted into the intra prediction unit 4 is outputted to the deblocking filter unit 14 through the selection unit 8 and the addition unit 13. The deblocking filter unit 14 performs a deblocking process to image data in an encoded block boundary in the first encoding method according to the first encoding method, in addition to the deblocking filter process according to H.264. The output of the deblocking filter unit 14 is again inputted into the intra prediction unit 4.

In addition to the deblocking process according to H.264, the deblocking filter unit 14 performs the deblocking process of the encoded block boundary according to the deblocking filter coefficient information S6.

The intra prediction unit 4 selects a method with better encoding efficiency among intra screen encoding methods defined by the standards, and performs an intra prediction process to the image data to which deblocking process has been performed. Subsequently, the intra prediction unit 4 outputs the signal after processing to the selection unit 8. The image data S5 inputted into the motion detection unit 5 undergoes a motion detection process with reference image data stored in the image memory unit 6 in advance. According to a motion vector detected by the motion detection process, the motion compensation unit 7 performs motion compensation to the image data S5, and outputs the resultant signal to the selection unit 8.

The selection unit 8 selects one of a signal from the intra prediction unit 4 and a signal from the motion compensation unit 7. The signal selected by the selection unit 8 is outputted to the subtraction unit 9. A difference signal, which is obtained by subtracting the signal outputted from the selection unit 8 from the baseband image data S5, is inputted into the orthogonal transform/quantization unit 10, and undergoes orthogonal transform and quantization. An output of the orthogonal transform/quantization unit 10 is outputted as the second encoded data S2 via a variable-length encoder 11. The orthogonally-transformed and quantized data undergoes inverse quantization and inverse transform in the inverse quantization/inverse transform unit 12. The addition unit 13 performs an addition process of the prediction signal from the selection unit 8 and the predicted error signal from the inverse quantization/inverse transform unit 12, and generates partial compressed-decompressed image data. The deblocking filter unit 14 performs, to a signal obtained by the addition process, a process to reduce block distortion due to the first encoding process, and a process to reduce block distortion due to the second encoding method. The processed result is stored in the image memory unit 6 as the reference image data.

By a series of operations described above, the block distortion due to MPEG-2 encoding can be reduced when the H.264 encoding is performed, and the problem in the past can be solved by the present invention.

This application is the National Phase of PCT/JP2008/050490, filed Jan. 17, 2008, which is based upon and claims the benefit of priority from Japanese patent application No. 2007-011329, filed on Jan. 22, 2007, the disclosure of which is incorporated herein in its entirety by reference.

Although the exemplary embodiments of the present invention have been described in detail, it should be understood that various changes, substitutions and alternatives can be made therein without departing from the spirit and scope of the invention as defined by the appended claims. Further, it is the inventor's intent to retain all equivalents of the claimed invention even if the claims are amended during prosecution.

INDUSTRIAL APPLICABILITY

The present invention can be utilized for re-encoding of an image.

REFERENCE SIGNS LIST

1 decoding circuit unit
2 encoding circuit unit
3 encoding information generation unit
4 intra prediction unit
5 motion detection unit
6 image memory unit
7 motion compensation unit
8 selection unit
9 arithmetic unit
10 orthogonal transform/quantization unit
11 variable-length encoder
12 inverse quantization/inverse transform unit
13 arithmetic unit
14 deblocking filter unit
15 decoding information analyzing unit
16 variable-length decoder
17 inverse quantization/inverse transform unit
18 arithmetic unit
19 motion compensation unit
20 image memory unit
21 deblocking filter unit
22 deblocking filter unit
23 image memory unit
S1 image data encoded by the first encoding method
S2 image data encoded by the second encoding method
S3 baseband image data after decoding
S4 first encoding parameter information
S5 baseband image data of which the block distortion in an encoded block is reduced at the time of decoding
S6 deblocking filter coefficient information
S7 baseband image data of which the block distortion by the first encoding is reduced after decoding

The invention claimed is:

1. An image re-encoding method to decode image data which is orthogonally transformed per first block and encoded by a first encoding method with an encoded block unit of a plurality of first orthogonal transform blocks, and to encode the decoded image data per second block by a second encoding method, the image re-encoding method comprising the steps of:
performing first deblocking filtering to perform a deblocking process to a block boundary bordered by a first orthogonal transform block in an encoded block in the second encoding; and
encoding the second block by determining the first deblocking filter strength with the use of the image data, and by changing second deblocking filter strength to an encoded block boundary of the first encoding method in accordance with the first deblocking filter strength.

2. The image re-encoding method according to claim 1, wherein the image data includes picture type information and macroblock type information as encoding parameters for the first encoding method, and wherein the first deblocking filter strength is enhanced when the picture type is an intra picture or when the macroblock type is an intra type.

3. The image re-encoding method according to claim 2, wherein the image data includes DCT type information as an encoding parameter information for the first encoding method, and
wherein the first deblocking filter strength is enhanced when the DCT type is a frame type.

4. The image re-encoding method according to claim 2, wherein the image data includes DCT type information as encoding parameter information for the first encoding method, and
wherein the first deblocking filter strength to a block boundary in the horizontal direction of the first encoding method is enhanced when the DCT type is a field type.

5. The image re-encoding method according to claim 2, wherein the image data includes DCT type information as encoding parameter information for the first encoding method, and
wherein the image re-encoding method further includes the steps of:
enhancing the first deblocking filter strength to a block boundary in the first encoding method when the DCT type is a frame type; and
enhancing the first deblocking filter strength to a horizontal boundary of a block in the first encoding method when the DCT type is a field type.

6. The image re-encoding method according to claim 2, wherein the first encoding method includes the step of calculating activity information indicative of degree of complexity of an image per orthogonal transform block, and
wherein, when the activity is less than a threshold, the first deblocking filter strength is enhanced.

7. The image re-encoding method according to claim 2, wherein the first encoding method includes the step of calculating activity information indicative of degree of complexity of an image per orthogonal transform block,
wherein, when the activity is less than a threshold, the image data includes DCT type information as encoding parameter information for the first encoding method, and
wherein the first encoding method further includes the steps of: enhancing the first deblocking filter strength to a block boundary of the first encoding method when the DCT type is a frame type; and enhancing the first deblocking filter strength to a horizontal boundary of a block in the first encoding method when the DCT type is a field type.

8. The image re-encoding method according to claim 1, wherein the image data includes quantization scale information as an encoding parameter for the first encoding method, and
wherein the first deblocking filter strength is enhanced as much as the quantization scale is coarse.

9. The image re-encoding method according to claim 1, wherein the image data includes picture type information, macroblock type information, and quantization scale information as encoding parameters for the first encoding method, and
wherein the first deblocking filter strength is enhanced as much as the quantization scale is coarse when the picture type is an intra picture or when the macroblock type is an intra type.

10. An image re-encoding device to decode image data which is orthogonally transformed per first block and encoded by a first encoding method with an encoded block unit of a plurality of first orthogonal transform blocks, and to encode the decoded image data per second block by a second encoding method, the image re-encoding device comprising:
first deblocking filter unit operable to perform a deblocking process to a block boundary bordered by a first orthogonal transform block in an encoded block in the second encoding; and
encoding unit operable to encode the second block by determining the first deblocking filter strength with the use of the image data, and by changing the second deblocking filter strength to an encoded block boundary of the first encoding method in accordance with the first deblocking filter strength.

11. The image re-encoding device according to claim 10, wherein the image data includes picture type information and macroblock type information as encoding parameters for the first encoding method, and
wherein the first deblocking filter strength is enhanced when the picture type is an intra picture or when the macroblock type is an intra type.

12. The image re-encoding device according to claim 11, wherein the image data includes DCT type information as encoding parameter information for the first encoding method, and
wherein the first deblocking filter strength to a block boundary in the horizontal direction of the first encoding method is enhanced when the DCT type is a field type.

13. The image re-encoding device according to claim 11, wherein the image data includes DCT type information as encoding parameter information for the first encoding method, and
wherein the image re-encoding device further comprises
enhancement unit operable to enhance the first deblocking filter strength to a block boundary in the first encoding method when the DCT type is a frame type; and
enhancement unit operable to enhance the first deblocking filter strength to a horizontal boundary of a block in the first encoding method when the DCT type is a field type.

14. The image re-encoding device according to claim 11, wherein the first encoding method includes activity calculation unit operable to calculate activity information indicative of degree of complexity of an image per orthogonal transform block, and
wherein, when the activity is less than a threshold, the first deblocking filter strength is enhanced.

15. The image re-encoding device according to claim 11, wherein the first encoding method includes activity calculation unit operable to calculate activity information indicative of degree of complexity of an image per orthogonal transform block,
wherein, when the activity is less than a threshold, the image data includes DCT type information as encoding parameter information for the first encoding method, and
wherein the first encoding method further includes enhancement unit operable to enhance the first deblocking filter strength to a block boundary of the first encoding method when the DCT type is a frame type, and operable to enhance the first deblocking filter strength to a horizontal boundary of a block in the first encoding method when the DCT type is a field type.

16. The image re-encoding device according to claim 10, wherein the image data includes quantization scale information as an encoding parameter for the first encoding method, and wherein the first deblocking filter strength is enhanced as much as the quantization scale is coarse.

17. The image re-encoding device according to claim 10,
wherein the image data includes picture type information, macroblock type information, and quantization scale information as encoding parameters for the first encoding method, and
wherein the first deblocking filter strength is enhanced as much as the quantization scale is coarse when the picture type is an intra picture or when the macroblock type is an intra type.

18. The image re-encoding device according to claim 10,
wherein the image data includes DCT type information as an encoding parameter for the first encoding method, and
wherein the first deblocking filter strength is enhanced when the DCT type is a frame type.

19. An image re-encoding program product, embodied on a non-transitory computer-readable medium, to make a computer execute an image re-encoding method to decode image data which is orthogonally transformed per first block and encoded by a first encoding method with an encoded block unit of a plurality of first orthogonal transform blocks, and to encode the decoded image data per second block by a second encoding method, the image re-encoding method comprising the steps of:
performing first deblocking filtering to perform a deblocking process to a block boundary bordered by a first orthogonal transform block in an encoded block in the second encoding; and
encoding the second block by determining the first deblocking filter strength with the use of the image data, and by changing second deblocking filter strength to an encoded block boundary of the first encoding method in accordance with the first deblocking filter strength.

20. The image re-encoding program product according to claim 19,
wherein the image data includes picture type information and macroblock type information as encoding parameters for the first encoding method, and
wherein the first deblocking filter strength is enhanced when the picture type is an intra picture or when the macroblock type is an intra type.

21. The image re-encoding program product according to claim 20,
wherein the image data includes DCT type information as encoding parameter information for the first encoding method, and
wherein the first deblocking filter strength to a block boundary in the horizontal direction of the first encoding method is enhanced when the DCT type is a field type.

22. The image re-encoding program product according to claim 20,
wherein the image data includes DCT type information as encoding parameter information for the first encoding method, and
wherein the image re-encoding method further includes the steps of:
enhancing the first deblocking filter strength to a block boundary in the first encoding method when the DCT type is a frame type; and
enhancing the first deblocking filter strength to a horizontal boundary of a block in the first encoding method when the DCT type is a field type.

23. The image re-encoding program product according to claim 20,
wherein the first encoding method includes the step of calculating activity information indicative of degree of complexity of an image per orthogonal transform block, and
wherein, when the activity is less than a threshold, the first deblocking filter strength is enhanced.

24. The image re-encoding program product according to claim 20,
wherein the first encoding method includes the step of calculating activity information indicative of degree of complexity of an image per orthogonal transform block,
wherein, when the activity is less than a threshold, the image data includes DCT type information as encoding parameter information for the first encoding method, and
wherein the first encoding method further includes the steps of: enhancing the first deblocking filter strength to a block boundary of the first encoding method when the DCT type is a frame type; and enhancing the first deblocking filter strength to a horizontal boundary of a block in the first encoding method when the DCT type is a field type.

25. The image re-encoding program product according to claim 19,
wherein the image data includes quantization scale information as an encoding parameter for the first encoding method, and
wherein the first deblocking filter strength is enhanced as much as the quantization scale is coarse.

26. The image re-encoding program product according to claim 19,
wherein the image data includes picture type information, macroblock type information, and quantization scale information as encoding parameters for the first encoding method, and
wherein the first deblocking filter strength is enhanced as much as the quantization scale is coarse when the picture type is an intra picture or when the macroblock type is an intra type.

27. The image re-encoding program product according to claim 19,
wherein the image data includes DCT type information as an encoding parameter information for the first encoding method, and
wherein the first deblocking filter strength is enhanced when the DCT type is a frame type.

* * * * *